United States Patent
Sundaresan et al.

(10) Patent No.: US 12,472,480 B2
(45) Date of Patent: Nov. 18, 2025

(54) CHEMICAL ACTUATORS

(71) Applicant: Ohio State Innovation Foundation, Columbus, OH (US)

(72) Inventors: Vishnu Baba Sundaresan, Columbus, OH (US); Robert Northcutt, Columbus, OH (US); Parker Evans, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 977 days.

(21) Appl. No.: 17/276,000

(22) PCT Filed: Sep. 12, 2019

(86) PCT No.: PCT/US2019/050856
§ 371 (c)(1),
(2) Date: Mar. 12, 2021

(87) PCT Pub. No.: WO2020/056167
PCT Pub. Date: Mar. 19, 2020

(65) Prior Publication Data
US 2022/0032259 A1    Feb. 3, 2022

Related U.S. Application Data

(60) Provisional application No. 62/730,230, filed on Sep. 12, 2018.

(51) Int. Cl.
*B01J 19/00* (2006.01)
*B01D 15/36* (2006.01)
(Continued)

(52) U.S. Cl.
CPC ........ *B01J 19/0093* (2013.01); *B01D 15/361* (2013.01); *B01D 15/3885* (2013.01);
(Continued)

(58) Field of Classification Search
CPC .......... B01J 19/0093; B01J 2219/00833; B01J 2219/00853; B01J 2219/00986;
(Continued)

(56) References Cited

U.S. PATENT DOCUMENTS 7,459,923 B2   12/2008  Caldwell et al.
8,083,927 B2 * 12/2011  Wang ................. A61B 5/14532
                                                              205/792
(Continued)

FOREIGN PATENT DOCUMENTS

CN        102879393 A      1/2013

OTHER PUBLICATIONS

Deflorian et al., Organic coating capacitance measurement by EIS: ideal and actual trends, Electrochimica Acta, 1999, 44, 4243-4249 (Year: 1999).*

(Continued)

*Primary Examiner* — Luan V Van
*Assistant Examiner* — Shizhi Qian
(74) *Attorney, Agent, or Firm* — Meunier Carlin & Curfman LLC (57) ABSTRACT

Disclosed herein are chemical actuators and ionic motive force transducers. The actuators and transducers are capable of converting an electrical stimulus into an ionic gradient within a reaction volume.

17 Claims, 8 Drawing Sheets

(51) Int. Cl.
  *B01D 15/38* (2006.01)
  *B01L 3/00* (2006.01)
  *G01N 27/30* (2006.01)
(52) U.S. Cl.
  CPC ...... *B01L 3/502715* (2013.01); *G01N 27/302* (2013.01); *B01J 2219/00833* (2013.01); *B01J 2219/00853* (2013.01); *B01J 2219/00966* (2013.01); *B01J 2219/00986* (2013.01); *B01L 2300/0645* (2013.01); *B01L 2300/0858* (2013.01); *B01L 2300/12* (2013.01)
(58) Field of Classification Search
  CPC .............. B01D 15/361; B01D 15/3885; B01L 3/502715; B01L 2300/0645; B01L 2300/0858; B01L 2300/12; G01N 27/302; G01N 33/48728
  See application file for complete search history.

(56) References Cited

U.S. PATENT DOCUMENTS

| | | | |
|---|---|---|---|
| 8,211,632 | B2 | 7/2012 | Petyt et al. |
| 9,084,546 | B2 | 7/2015 | Richardson-Burns et al. |
| 9,138,693 | B2 | 9/2015 | Aquad |
| 2005/0121614 | A1 | 6/2005 | Stuttard |
| 2009/0232740 | A1* | 9/2009 | Rishpon .............. G01N 33/5011 424/9.2 |
| 2009/0318848 | A1* | 12/2009 | Shippy, III .......... A61M 25/104 604/20 |
| 2011/0099786 | A1* | 5/2011 | Petyt ...................... G01N 33/66 29/428 |
| 2014/0007649 | A1 | 1/2014 | Niemann et al. |
| 2014/0251805 | A1* | 9/2014 | Salzillo .............. G01N 27/3335 204/406 |
| 2016/0003766 | A1* | 1/2016 | Johnson ............. G01N 33/5306 205/792 |
| 2017/0370870 | A1* | 12/2017 | Fomina ................ G01N 27/305 |
| 2018/0318834 | A1* | 11/2018 | Fomina ............ B01L 3/502715 |

OTHER PUBLICATIONS

Florea et al., Dynamic pH mapping in microfluidic devices by integrating adaptive coatings based on polyaniline with colorimetric imaging techniques, Lab on a chip, 2013, 13, 1079-1085 (Year: 2013).*

Miyamoto et al., High-speed chemical imaging inside a microfluidic channel, Sensors and Actuators B: Chemical, 2014, 194, 521-527 (Year: 2014).*

Teh et al., A micro-gap sensor based on conducting polypyrrole, the 7th Int. Conf. Miniaturized Chemical and Biochemical Analysis Systems, Oct. 5-9, 2003, Square Valley, CA, USA (Year: 2003).*

Ferreira et al., Optical pH sensitive material based on bromophenol blue-doped polypyrrole, Sensors and actuators B: Chemical, 2009, 137, 426-431 (Year: 2009).*

West et al., Chronoamperometric study of conformational relaxation in PPy(DBS), Journal of Physical Chemistry B, 2009, 113, 1277-1293 (Year: 2009).*

West et al., Supporting Information of Chronoamperometric study of conformational relaxation in PPy(DBS), Journal of Physical Chemistry B, 2009, 113, 1277-1293 (Year: 2009).*

Sundaresan et al., Dynamics of ion transport in a bio-derived ionic transistor, Behavior and Mechanics of Multifunctional Materials and Composites, Proc. of SPIE, 2011, vol. 7978, 79780B, doi: 10.1117/12.880504 (Year: 2011).*

International Search Report and Written Opinion issued by the International Searching Authority (ISA/US) in PCT Application No. PCT/US2019/050856 on Nov. 25, 2019. 12 pages.

R. G. Northcutt and V.B. Sundaresan, "Mechanoelectrochemistry of PPy(DBS) from correlated characterization of electrochemical response and extensional strain," Phys. Chem. Chem. Phys., vol. 17, pp. 32268-32275, 2015.

V. Venugopal, V. Venkatesh, R. G. Northcutt, J. Maddox, and V. B. Sundaresan, "Nanoscale polypyrrole sensors for near-field electro-chemical measurements," Sensors and Actuators, B: Chemical, vol. 242, pp. 1193-1200, 2017.

V. Venugopal, T. Hery, V. Venkatesh, and V. B. Sundaresan, "Mass and charge density effects on the saturation kinetics of polypyrrole doped with dodecylbenzene sulfonate," Journal of Intelligent Material Systems and Structures, vol. 28, pp. 760-771, 2017.

V. Venugopal and V. B. Sundaresan, "Polypyrrole-based amperometric cation sensor with tunable sensitivity," Journal of Intelligent Material Systems and Structures, vol. 27, pp. 1702-1709, 2016.

R. G. Northcutt and V. B. Sundaresan, "Phospholipid vesicles as soft templates for electropolymerization of nanostructured polypyrrole membranes with long range order," Journal of Materials Chemistry A, vol. 2, p. 11784, 2014.

L. N. Vandenberg, R. D. Morrie, and D. S. Adams, "V-ATPase-dependent ectodermal voltage and pH regionalization are required for craniofacial morphogenesis," Developmental Dynamics, vol. 240, No. 8, pp. 1889-1904, 2011.

A. Tseng and M. Levin, "Probing endogenous ionic controls of pattern formation," Communication and Integrative Biology, vol. 6, No. 1, pp. 1-8, 2013.

Sadki, S., Schottland, P., Brodie, N., & Sabouraud, G. Chem. Soc. Rev., 2000,29, 283-293.

Baur, P. S., and T. R. Stacey. "The use of PIPES buffer in the fixation of mammalian and marine tissues for electron microscopy." Journal of Microscopy 109.3 (1977): 315-327.

International Preliminary Report on Patentability issued for Application No. PCT/US2019/050856, dated Mar. 25, 2021.

* cited by examiner

Video Script First Iteration

• Added two video output objects at differing frame rates during the video analysis so that the frames that are analyzed are available as raw data

• Added time stamp and analysis area stamps in May 2018

8/6/2018

```
timeStep = 10; %sample rate (s)
slowPlayback = 1;
fastPlayback = 20;

outVideoName_Fast = [splitInVideoName{1}, ['_ColorimetricSample_',
num2str(fastPlayback), 'FPS']];
outVideoName_Slow = [splitInVideoName{1}, ['_ColorimetricSample_',
num2str(slowPlayback), 'FPS']];

%create video Reader
inVid = VideoReader(fullfile(inVideoPath, inVideoName));

%Create video writers
outVid_20FPS = VideoWriter(fullfile(inVideoPath, outVideoName_Fast));
%default is motion compressed
outVid_20FPS.FrameRate = fastPlayback; % outVid shows properties.
All properties must be set before .
open(outVid_20FPS);

outVid_1FPS = VideoWriter(fullfile(inVideoPath, outVideoName_Slow));
%default is motion compressed
outVid_1FPS.FrameRate = slowPlayback; % outVid shows properties. All
properties must be set before .
open(outVid_1FPS);

structarray = ({ });
    while inVid.CurrentTime < inVid.Duration - timeStep
        frame = readFrame(inVid);

writeVideo(outVid_20FPS, frame);
        writeVideo(outVid_1FPS, frame);

frame_columns = reshape(frame, [ ], 3);
        [frame_Colors, RGB_Vals, n] = unique(frame_columns, 'rows');

color_Index = accumarray(n, 1);
        color_Index(:,2) = frame_Colors(:,1);
        color_Index(:,3) = frame_Colors(:,2);
        color_Index(:,4) = frame_Colors(:,3);
```

FIGURE 13A

Live Streaming

```
else    % Live Video date_time = strsplit(datestr(datetime), ' ');
    time = strsplit(date_time{2}, ':');

outVideoName = [char(date_time{1}), '_', char(time{1}), '-', char(time{2}), '-', char(time{3}), '_', ];
    %Create video writers
    outVid = VideoWriter([char(vidPath), char(getMack), char(outVideoName), '.mp4'], 'MPEG-4');
    outVid.FrameRate = playbackFPS; % outVid shows properties. All properties must be set before open.
    open(outVid);

structarray = { [ ] };
    pause on;

cam = webcam(cameraName);
    if cameraName == "HD USB Camera"
        cam.Resolution = '1920X1080';
    end CaptPreview = figure;
    H = uicontrol('Style', 'PushButton', 'String', 'Stop', 'Callback', 'delete(gcbf)' );

while (ishandle(H))
        frame = snapshot(cam);
        image(frame);
        writeVideo(outVid, frame);
        % pause(timeStep);
    end
    clear cam;
end
```

FIGURE 13B

```
⊞ function VidAnalysis (vidPath, inVidName, isLiveStream, dye, timeStep, playbackFPS, cameraName) [...]
  % Pass in UI Variables %% FUNCTIONS
%% CountPixels
⊞ function [countLo, countHi] = CountPixels_Grey(frame_Cropped, dye) [...]

⊞ function [countLo, countHi, countUniqueColors] = CountPixels_RGB(frame_Cropped, dye) [...]

%% Set Plot Labels
⊞ function setPlotLabels [...]

%% Image Segmentation
⊞ function [segmentedAvgGrey] = segmentFrame_Grey(frame_Cropped, nRows, nCols) [...]
⊞ function [segmentedAvgRed, segmentedAvgBlue, segmentedAvgGreen, segmentedAvgGrey] = segmentFrame_RGB( %% HeatMap
⊞ function cellHeatMapData = grey2pH(segmentedAvgGrey, dye) [...]
⊞ function cellHeatMapData = RGB2pH(segmentedAvgRed, segmentedAvgBlue, segmentedAvgGreen, dye) [...]
```

FIGURE 13C

CHEMICAL ACTUATORS

CROSS-REFERENCE TO RELATED APPLICATION

This application is a national stage application filed under 35 U.S.C. § 371 of PCT/US2019/050856 filed Sep. 12, 2019, which claims the benefit of U.S. Provisional Application 62/730,230, filed on Sep. 12, 2018, the contents of which are hereby incorporated in their entirety.

FIELD OF THE INVENTION

The invention is directed to chemical actuators, ionic motive force transducers, and applications thereof.

SUMMARY

Disclosed herein are ionic motive force transducers that can function as chemical actuators. A chemical actuator is a device that generates a chemoelectrical gradient in a controlled volume using an externally applied stimulus. The chemoelectrical gradient is anticipated to be useful for any application in which a defined concentration is required at most times and a different pre-determined concentration is required for limited durations. An ionic force transducer is a device that converts an applied energy input into a chemical force.

The details of one or more embodiments are set forth in the descriptions below. Other features, objects, and advantages will be apparent from the description and from the claims.

BRIEF DESCRIPTION OF THE FIGURES

FIG. 1: Schematic for the programmable chemical actuator showing different components. This device is projected to be used in closed-loop for (a) investigate ion transport processes in neural stem cells or other cells in cultured microenvironments, (b) pharma manufacturing, (c) 3D printing of tissues or manufacturing of synthetic grafts, (d) improving efficacy of drug delivery in cancer, (e) controlling neuronal signaling in neurodegenerative diseases, (f) food processing, (g) controlling enzymatic reactions, (h) regeneration of energetic molecules for biochemical assays and (i) regenerative medicine and tissue engineering.

FIG. 3: (L-R) Set up for reversible regulation of pH in a cuvette. This assembly is a programmable pH actuator. Reversible reduction and oxidation of PPy(DBS) membranes in buffered and non-buffered media removes and releases protons/hydroxyl from WE/CE respectively into the media and pH increases near the CE, as described in indirect mode. A visual observation of change in color between yellow and purple shows the ability to switch pH.

FIGS. 13A-13C: Example scripts used for the video analysis used to obtain results shown in FIGS. 10 and/or 11. FIG. 13A is an example video script.

DETAILED DESCRIPTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes¬from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

Disclosed herein are chemical actuators and ionic motive force transducers. Chemical actuators generate a chemoelec- trical gradient in a controlled volume using an externally applied stimulus. Ionic motive force transducers are devices that convert an applied energy input, for instance, an electrical input, into a chemical force, i.e., an ionic gradient in a solution. The actuators and transducers include three electrodes—a working electrode ("WE"), counter electrode ("CE"), and reference electrode ("RE"). The working and counter electrodes can be in electrical communication with a meter, which is configured to deliver an electrical stimulus to the working electrode. The electrical stimulus can be an applied current or applied potential. The meter may further include a processor for controlling the degree and duration of the electrical stimulus. The meter may also include a recorder for analyzing and processing signals received from the actuator or transducer. In some embodiments, the signals are visual in nature, and may be acquired using spectroscopic means like UV/vis. In other cases, the signals include electrical feedbacks for the distribution of ions in the actuator or transducer. The reference electrode may further be in communication with the recorder. The recorder can include control software with network communication functions and learning algorithms.

The reference electrode is a conductive material, for instance Ag/AgCl, standard hydrogen electrode (SHE), standard calomel electrode (SCE)

The counter electrode is a conductive material such as gold, platinum, carbon paper and electrical conductors/faradaic material that can adsorb counter ions from solution.

The working electrode includes a conductive polymer. Exemplary conductive polymers include poly(pyrrole), poly(acetylene), poly(aniline), poly(p-phenylene vinylene), poly(fluorene), poly(phenylene), poly(pyrene), poly(azulene), poly(naphthalene), poly(carbazole), poly(indole), poly(azepine), poly(thiophene) poly(p-phenylene sulfide), poly(furan), copolymers thereof, and combinations thereof. Exemplary polythiophenes include poly(3,4-propylenedioxythiophene) and poly(3,4-ethylenedioxythiophene). Poly(pyrrole) is a preferred conductive polymer.

In certain embodiments, the conductive polymer can have the formula:

wherein X is NH, S, O, or Se, R is independently selected from H, $C_{1-6}$alkyl, $C_{1-6}$alkoxy, $C_{1-6}$haloalkyl, $C_{1-6}$haloalkoxy, F, Cl, Br, I, CN, $NO_2$, and m is 0, 1 or 2. In some embodiments, two R groups may be together form a ring, such as found in poly(3,4-ethylenedioxythiophene). Compounds in which X is NH are designated polypyrroles, when X is O are designated polyfuran, when X is S are designated polythiophene, and when X is Se are designated polyseleophene. In some embodiments, the conductive polymer can include compounds in which X is a mixture of O, S and/or NH.

The conductive polymers may be doped. The dopant can be polymeric, for instance a polysulfonic or polycarboxylic acid. Polystyrene sulfonate is one such suitable polymeric dopant. In certain embodiments, the dopant is a sterically large anion, for instance, dodecylbenzenesulfonate, polystyrene sulfonate, p-toluene sulfonate, 1,4-piperazinediethanesulfonic acid, or 4-(2-hydroxyethyl)piperazine-1-ethanesulfonic acid. In other embodiments, the dopant can be chloride, fluoride, bromide, iodide, sulfonate, nitrate, phosphate, perchlorate, or borate. In some embodiments, the dopant can be a cationic species, for instance alkali and alkaline earth metals like sodium, calcium, and potassium. The dopant can be an ammonium species, including quaternary ammonium salts. In some embodiments, the dopant can be a zwitterionic species, for instance choline and amino acids.

The conductive polymers can have a varying degree of charge density, depending on the intended use for the actuator or transducer. In some embodiments, the conductive polymer has a charge density from 0.01-1,000 $C/cm^2$, 0.01-500 $C/cm^2$, 0.01-250 $C/cm^2$, 0.01-100 $C/cm^2$, from 0.05-50 $C/cm^2$, from 0.1-25 $C/cm^2$, from 0.25-10 $C/cm^2$, from 0.5-10 $C/cm^2$, from 0.75-10 $C/cm^2$, from 1-10 $C/cm^2$, from 0.1-7.5 $C/cm^2$, from 0.1-5 $C/cm^2$, from 0.1-2.5 $C/cm^2$, from 0.1-1 $C/cm^2$, from 0.5-7.5 $C/cm^2$, from 0.5-5 $C/cm^2$, from 0.5-2.5 $C/cm^2$, or from 0.5-1.5 $C/cm^2$.

The working electrode can also include a conductive substrate in contact with the conductive polymer. In some instances, the conductive substrate can be the same material as the counter electrode, while in other embodiments they are different. The working electrode can have a variety of shapes, including circular, oval, polygonal (e.g., quadrilateral), and others. Suitable quadrilateral films include square and rectangles. The working and counter electrodes can have the same shape and size, or can be differently shaped or sized.

The thickness of the working electrode can be no greater than 50 μm, no greater than 25 μm, no greater than 15 μm, no greater than 10 μm, no greater than 5 μm, no greater than 2.5 μm, no greater than 1 μm, no greater than 0.5 μm, no greater than 0.25 μm, or no greater than 0.1 μm.

The three electrodes described above may be part of a chemical actuator or ionic force transducer. The actuator or transducer includes at least one reaction chamber defining a volume configured to contain the reaction medium. The reaction chamber has a reaction chamber major axis. The working electrode is disposed on one side of the chamber and the counter electrode is disposed on the other side of the chamber along the major axis. Generally, the reference electrode may be disposed anywhere in the reaction chamber, so long as it can contact the reaction medium. The shape of the reaction chamber can be defined by a cross section taking perpendicular to the major axis. Suitable cross-section shapes include circles, ovals and polygons. For instance, when the reaction chamber is a cylindrical dish, the cross section would be a circle. When the reaction chamber is box shaped, the reaction chamber would be a polygon.

In some cases, the reaction chamber will contain a base. Such embodiments include dishes with one or more side walls upon which the working and counter electrodes are disposed. In other embodiments, the reaction chamber is a channel, configured for the reaction medium to enter the reaction chamber at one end and exit the reaction chamber at another end. The channel can come in a variety of shapes, including closed (i.e., tubes) and open (i.e, troughs). The shape of the channel can be defined according to a cross-section taken perpendicular to the length of the channel. Closed channels have cross sections such as circles, ovals and polygons, whereas open channels have cross sections in the shape of a U or V.

A chemical actuator is a device that generates a chemo-electrical gradient in a control volume using an externally applied stimulus. The chemoelectrical gradient is anticipated to be useful in all applications where a defined concentration is required at most times and a different pre-determined concentration is required for limited durations. The changes (increase/decrease) in concentration is created by the chemical actuator in the control volume following the values specified in the software. It should be noted that the chemical actuator is a device that is analogous to a mechanical actuator (that generates force) or an electrical generator (that provides electron motive force—emf). The chemical actuator is defined by the ion motive force (imf) that can be generated by the actuator in a given three-dimensional control volume
frequency at which the imf can be applied to the volume.

Due to these specifications, the gravimetric energy and power density of the chemical actuator can be specified following the electrochemical, geometric and gravimetric definitions of the actuator.

A programmable chemical actuator is a three-electrode electrochemical cell that regulates and maintains the spatiotemporal concentration of ions using a predetermined dataset. The electrochemical cell is constructed with a conducting polymer as the working electrode, reference electrode and counter electrode. The construction of conducting polymer (areal charge density, porosity, thickness and dopant selection) electrode, design of the electrochemical cell, cross-sectional area, placement of electrodes, surface area of counter electrode influences the performance of the programmable chemical actuator.

In some embodiments, the programmable chemical actuator includes the following components.

(1) electrochemical cell (chemical actuator)
(2) electronic hardware to control programmable chemical actuator (PCA)
(3) software interfacing with the electronic hardware with the required spatiotemporal concentration of ions available as a data file
(4) imaging hardware or electrochemical ion sensor assembled around the electrochemical cell that can visualize the distribution of ions, and apply a predetermined signal to maintain a desired concentration of ions in target volume in the electrochemical cell Referring now to FIGS. 8-12, techniques for detecting the extent of pH regulation and controlling the pH in the solution in feedback loop are described. As described herein, the ionic motive force transducer can include a processor. This disclosure contemplates that the processor can be the processing unit 806 shown in FIG. 8. The processor can be configured to execute computer-readable instructions stored in memory such as system memory 804 and/or removable or non-removable storage 808, 810 shown in FIG. 8. Additionally, the ionic motive force transducer can include imaging hardware (e.g., an imaging device) or an electrochemical ion sensor for detecting the pH of a solution within the chamber. The three electrodes (e.g., WE, CE, and RE), processor, imaging hardware, and/or electrochemical ion sensor can be communicatively connected with one another using one or more communication links. This disclosure contemplates the communication links are any suitable communication link. For example, a communication link may be implemented by any medium that facilitates data exchange between the elements including, but not limited to, wired, wireless and optical links.

Figure 9:
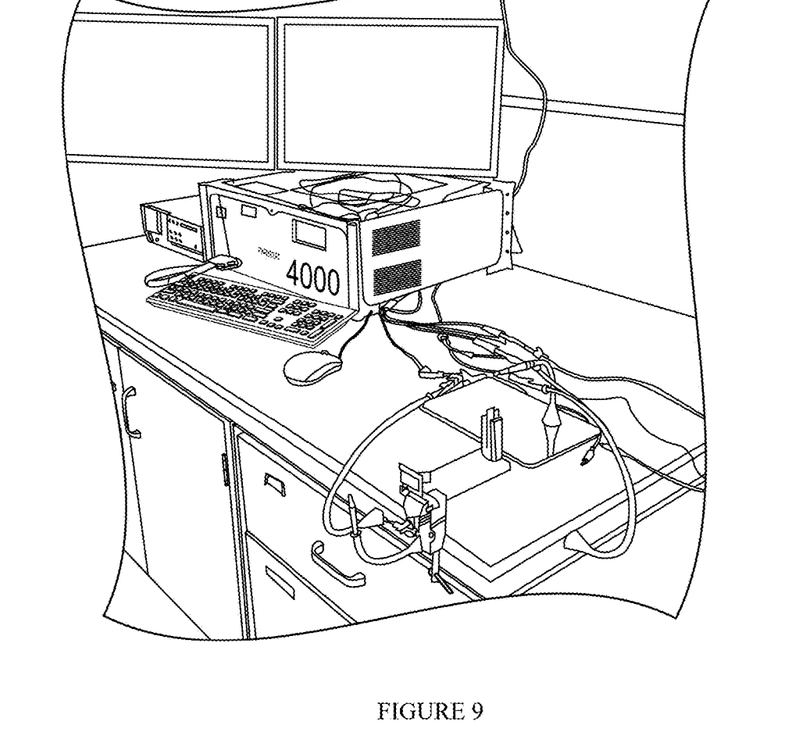
FIG. 9: A dual monitor setup where a high definition ("HD") universal serial bus ("USB") camera with 6 cm focal length, 1080p resolution is held by a three-dimensional ("3D") printed fixed focal length holder.
Figure 10:
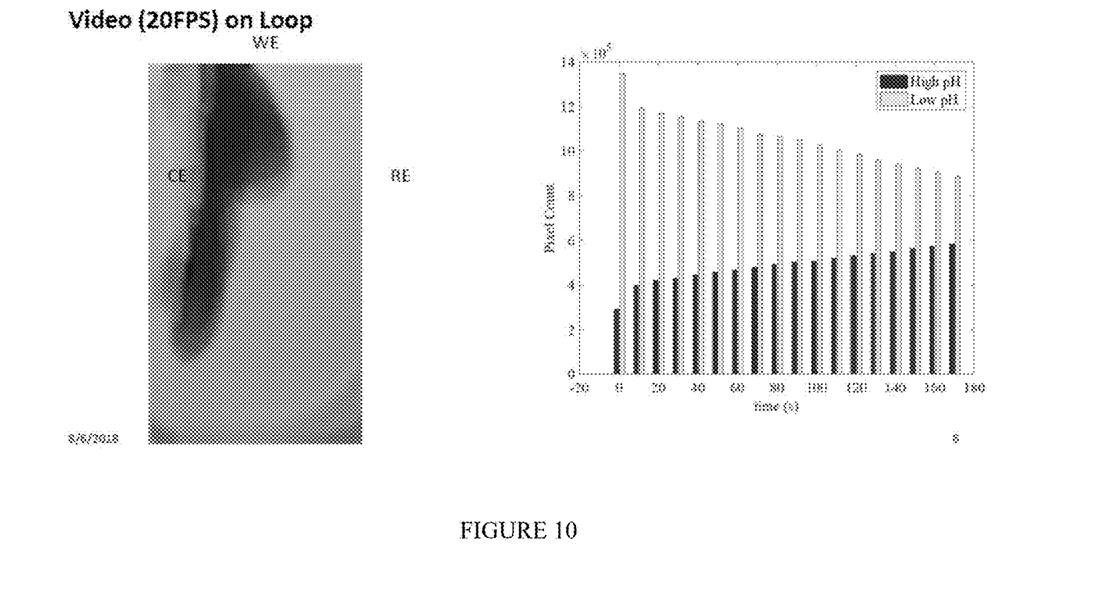
FIG. 10: Results of a video analysis of 0.1M NaCl solution with 0.04% bromocresol purple ("BCP").
Figure 11:
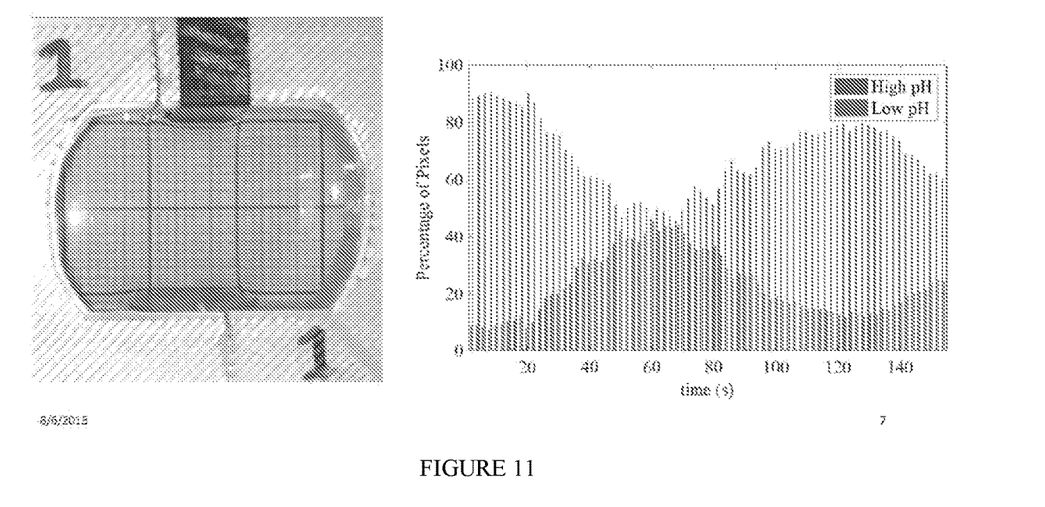
FIG. 11: Results of another video analysis.
Figure 12:
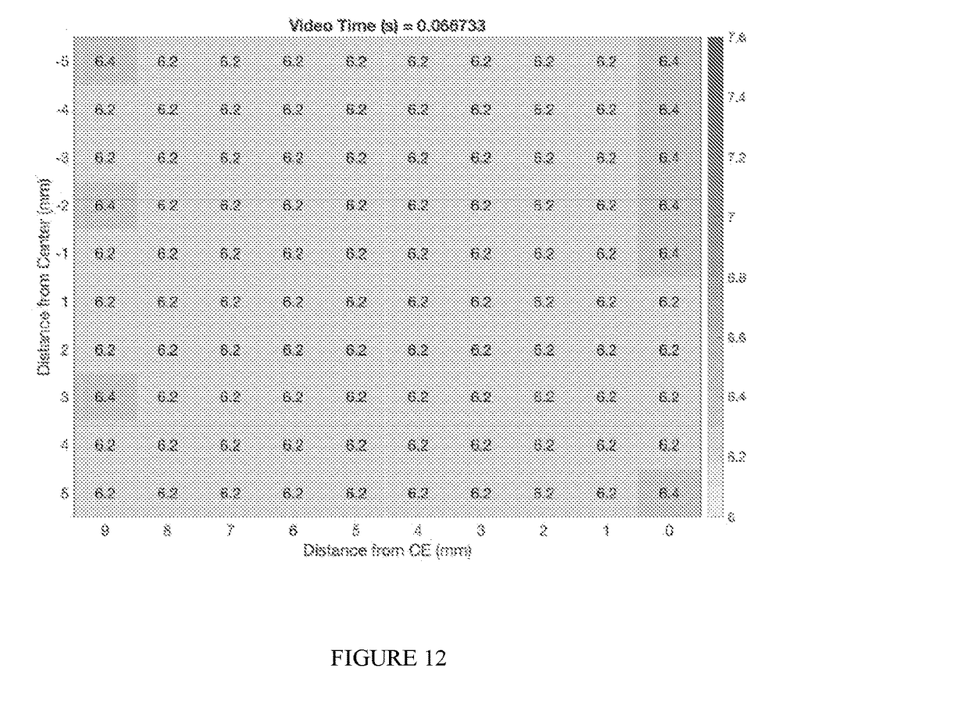
FIG. 12: A heatmap analysis of the results of FIG. 11.
Figure 13A:
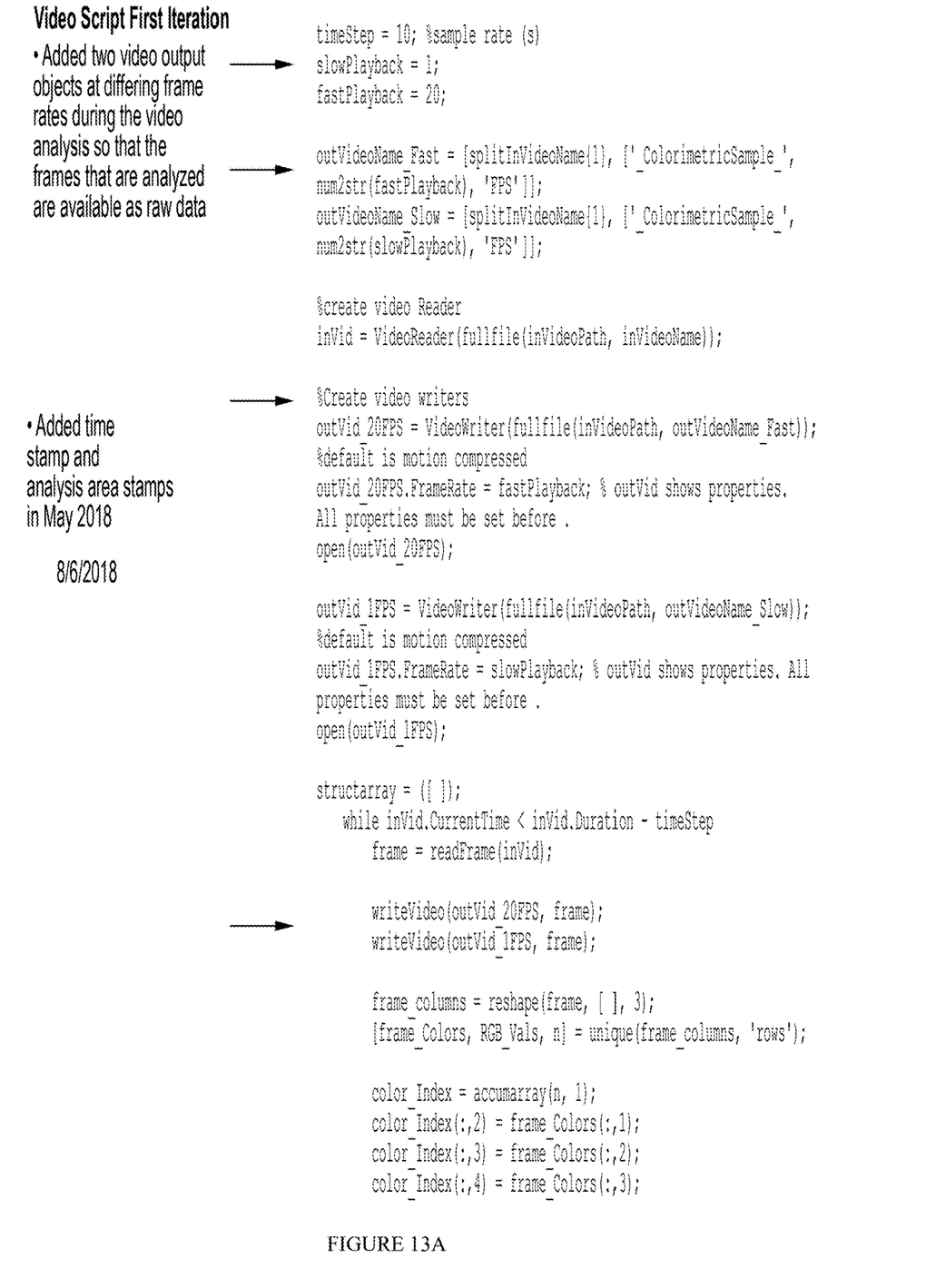
Figure 13B:
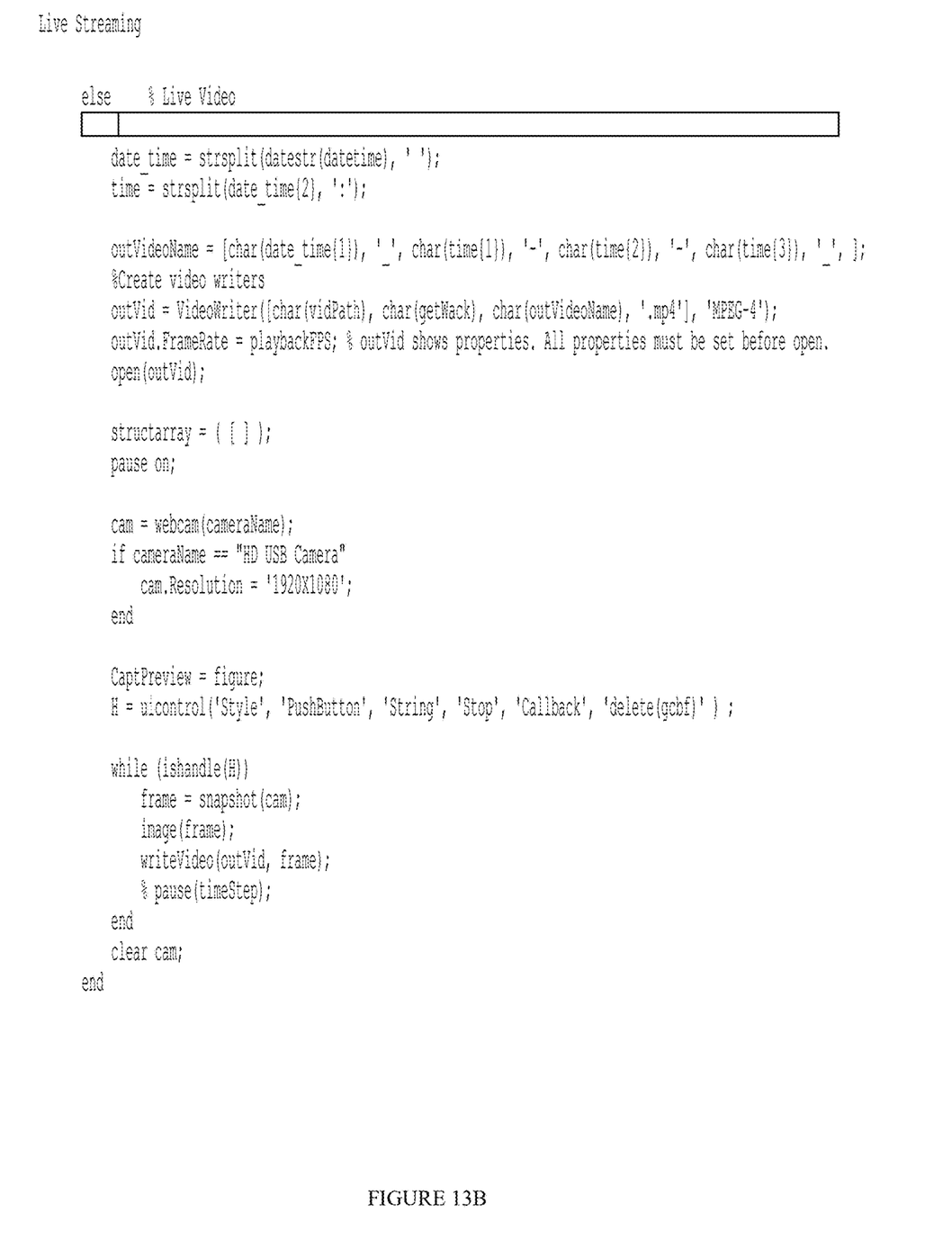
FIG. 13B is an example live streaming script.
Figure 13C:
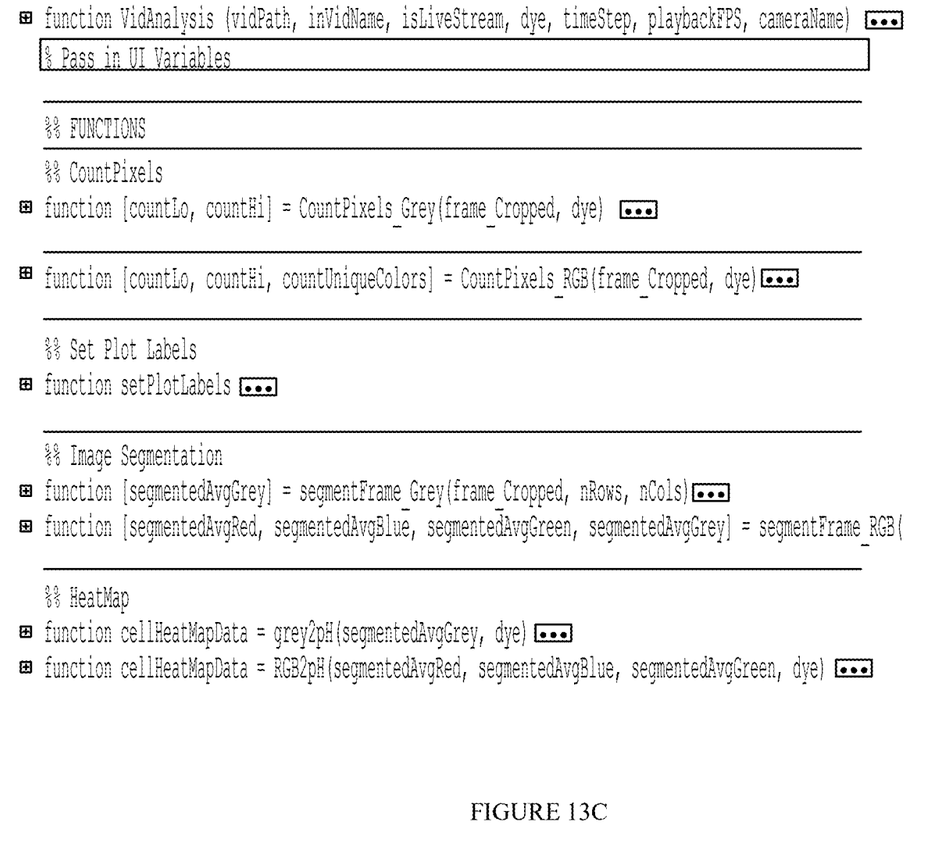
FIG. 13C is example script functions.

The imaging hardware (e.g., an imaging device) or electrochemical ion sensor can be used to detect pH of the solution within the chamber of the ionic motive force transducer. FIG. 9 illustrates a dual monitor setup where an HD USB camera with 6 cm focal length, 1080p resolution is held by a 3D printed fixed focal length holder. It should be understood that the camera (e.g., imaging device) and/or the holder shown in FIG. 9 are provided only as examples and that others can be used. The imaging device is configured to capture one or more images of the solutions within the chamber of the ionic motive force transducer. For example, the imaging device can capture video of the solution. As described herein, a pH indicator such as bromocresol purple dye can be added to the solution. The pH indicator changes color based on the pH of the solution. The processor can receive and analyze the one or more images (e.g., video frames) captured by the imaging device. For example, the processor can count the number of pixels having certain colors (e.g., the number of yellow pixels and/or the number of purple pixels). Alternatively or additionally, the processor can analyze the spatial arrangement of the various colored pixels within the chamber (e.g., distance from WE, CE, RE, center, etc.). Using this data, the processor can determine the pH of the solution. FIG. 10 illustrates example results of a video analysis of 0.1M NaCl solution with 0.04% bromocresol purple ("BCP"). FIG. 11 illustrates another example results of a video analysis. FIG. 12 illustrates a heatmap analysis of the results of FIG. 11. Alternatively or additionally, an electrochemical ion sensor can be used to detect pH of the solution. Electrochemical ion sensors are known in the art and therefore not described in further detail herein. Further, this disclosure contemplates using closed loop feedback control. For example, the pH of the solution can be controlled in response to the detected pH by applying a predetermined electrical signal to the WE.

A pH actuator is a specific implementation of the chemical actuator and is designed to regulate the concentration of hydrogen ions in solution. The pH actuator, like all chemical actuators, can regulate pH by directly changing the concentration of $H^+$ ions in solution or by changing the concentration of $OH^-$ ions in solution. Depending on the ion that contributes to change the pH, we define two operating modes for the chemical actuator—direct mode and indirect mode.

Direct mode: In this mode, pH of the solution is influenced by the addition/removal of H+ ions and changes in pH occurs in the vicinity of WE. The conducting polymer membrane is designed with sufficient capacity to effect the necessary changes in solution. In one embodiment, polypyrrole membrane doped with chloride [PPy(Cl)] was electropolymerized to predetermined charge density (~1 $C/cm^2$) on a 0.75 $cm^2$ gold pad. The electrochemical cell in the programmable pH actuator is fabricated with PPy(Cl) film as WE, a 0.75 $cm^2$ gold pad as CE and an Ag/AgCl pellet as RE. The test media is prepared with 0.1 mM NaCl and 5 mM bromocresol purple dye (pH indicator, yellow for pH 7 and purple for pH 8). The polymer was first equilibrated by cyclic voltammetry (between −600 mV and +600 mV with a scan rate of 10 mV/sec) until the charge ingress/egress are equal. This continuous cycling till equilibration renders the polymer tuned to selectively take in protons for electrochemical reduction and oxidation.

Figure 1:
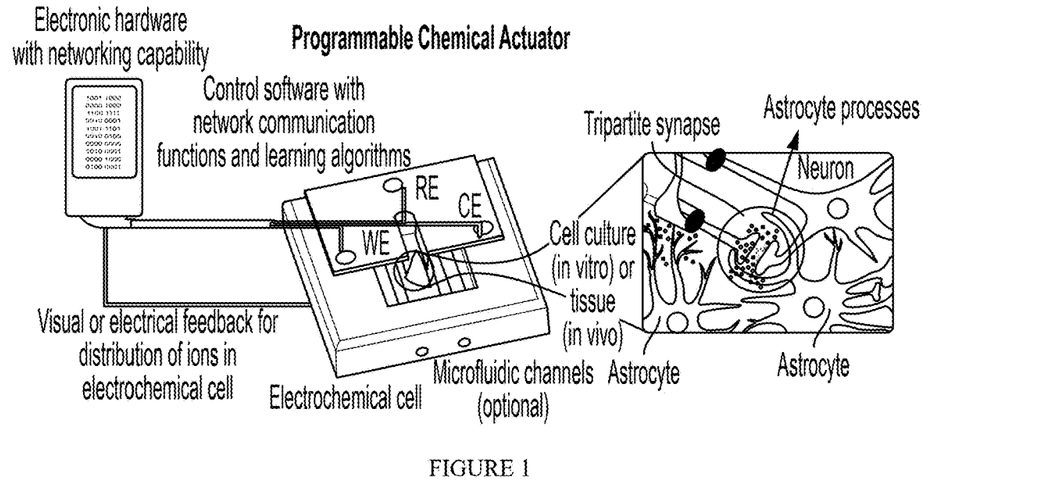
Figure 2:
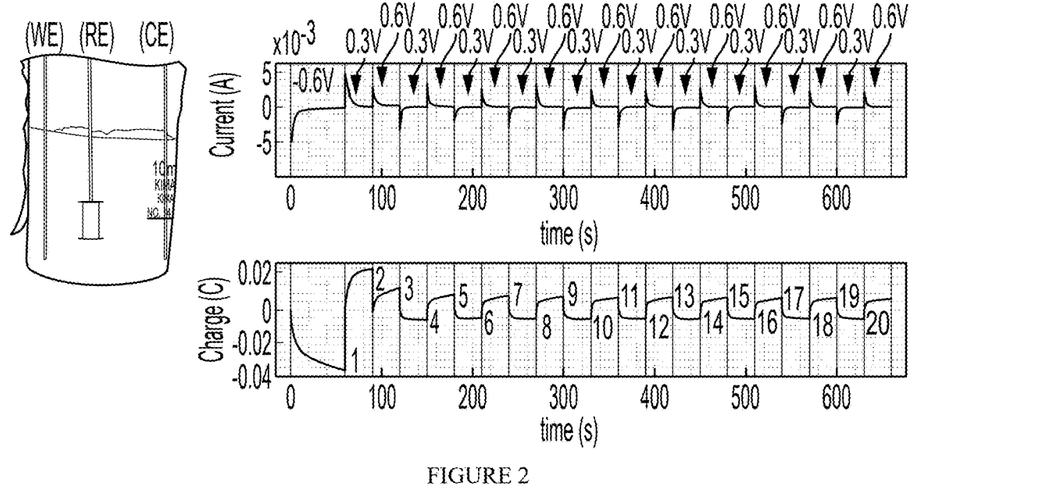
FIG. 2: (Left) picture of electrochemical cell demonstrating large volume pH manipulation using mobile anions and (right) current and charge response observed during applied electrical potentials giving detail on the number of ions participating in transport phenomena.

The equilibrated cell is used as the pH actuator by the application of an oxidation and reduction is influenced by the application of constant electrical fields (between $V_1$=300 and $V_2$=−600 mV for time period T=10, 30, 60 150, 300 seconds)) and current in to and out of the polymer is monitored. Using this setup, a 10 mL beaker solution was shown to be polarized, with ½ the solution showing a purple color (pH>6.8) and the other ½ of the solution showing a yellow color (pH<5). This was completely reversible by changing the polarity of the applied electrical potential (FIG. 2).

Indirect mode: In this mode, the change in concentration is generated by leveraging the kinetics of diffusive ion transport between the ion and its counter ion at WE and CE respectively. An implementation of indirect mode in a cuvette is shown in Figure. In this setup, RE (Ag/AgCl) is kept between the WE (PPy(DBS)) and CE (Au), and at a higher elevation in the cuvette. As PPy(DBS) is reduced, protons in the solution move in to WE, and hydroxyl ions move to CE. The accumulation of ions on WE/CE results in ion-counterion depleted region in the center for the duration the polymer is held in reduced state. As the polymer is oxidized, protons exit WE and hydroxyl ions exit CE at different rates as dictated by the kinetics of ion egress from the respective electrodes. In this setup, the hydroxyl ions exit the CE at a rate faster than WE, and temporarily produces a region of higher hydroxyl ion concentration. Thus, this volume near the CE becomes more basic, and hence a pH indicating dye changes purple as seen in the pictures in FIG. 3. In the next reduction cycle, the egressed ions trace their path back to the respective electrodes, and the region between the electrodes become depleted of hydroxyl ions, returning to acidic pH. In the subsequent oxidation and reduction cycle, the process repeats again, and hence the region between the electrodes cycles between acidic and basic conditions repeatedly.

The conductive polymer can be made selective to one or more ions by doping with the appropriate salt. For instance, a conducting polymer membrane such as PPy(DBS) is selective to a cation (Na+) when NaDBS was used as the dopant salt in the electropolymerization solution. This selectivity can be altered by cycling the polymer in an ion containing solution of known concentration. Through experimental demonstration, we have shown that PPy-based membranes can be designed to be exclusively selective to a wide catalog of cations and anions. Examples include—

Cations: $H^+$, $Li^+$, $Na^+$, $K^+$, $Ca^{2+}$, $Mg^{2+}$, $Mn^{2+}$, and charged antibodies.

Figure 4:
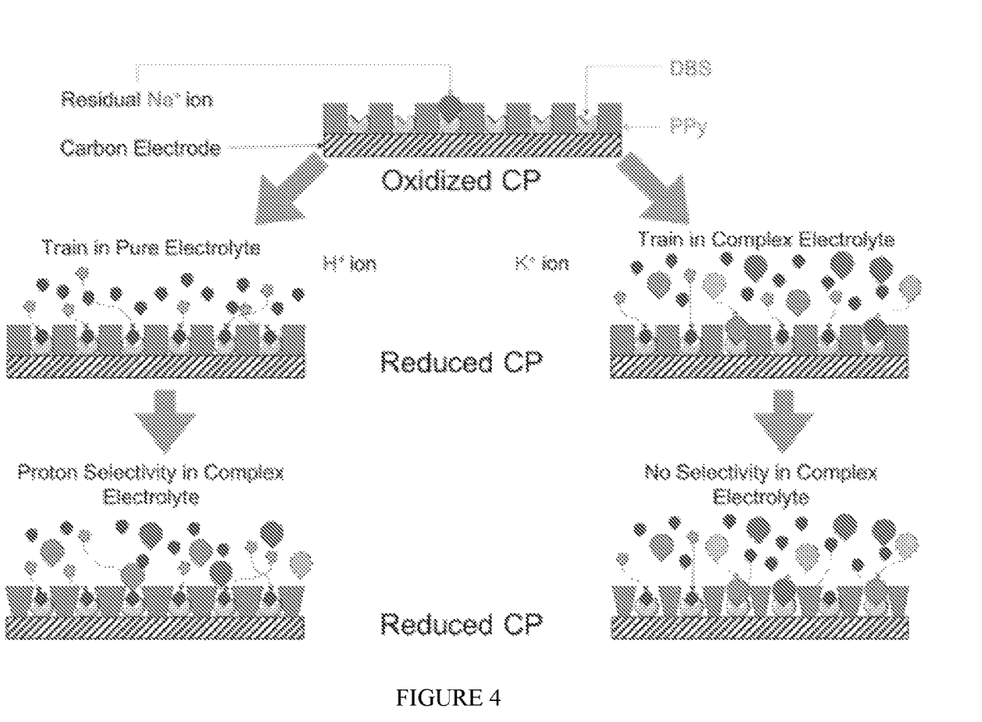
FIG. 4: Protocol to tailor selectivity of ions in the chemical actuator.

Anions: $Cl^-$, $OH^-$, $HPO_4^{2-}$, and other negatively charged antibodies. The procedure for rendering the polymer selective to a specific ion requires training the polymer in an electrolyte containing just the desired ion and its counter ion. After repeated cycling during the training process, the polymer retains its selectivity in the complex electrolyte. This selectivity is observed by performing a CV in a complex electrolyte, and the peaks corresponding to the specific ion is observed to have a dominant response. FIG. 4 illustrate the process of making a conductive membrane selective for a particular ion.

In the context of chemical actuators, the induced chemical gradient exerts its effect upon a sensor. Sensor is defined broadly to include everything that responds to a change in chemical gradient. For instance, the sensor can be a whole cell, a cellular substructure (including nucleus, cell wall, mitochondria, etc), biological macromolecule (including proteins, glycoproteins, DNA, RNA, polysaccharides, etc), polymers, small molecules (e.g., non polymeric chemical compounds), and various solution mixtures including sea water, brine, and brackish water)

A cell's electrical state refers to a collection of chemoelectrical variables such as transmembrane potential, membrane diffusion constant, cell capacitance, chemoelectrical gradients and stored electrical energy. This electrical state regulates ion transport through the cell membrane and controls diverse biological functions including cell differentiation, cell fate determination and cell migration. The regulation of electrical state of a cell has been shown by changing concentrations of relevant ions via fluid exchange and microfluidic kits. In these experiments, regulation of membrane potential of a select group of cells in *Xenopus laevis* demonstrated loss- or gain-of cell function. The microfluidic devices introduce varying levels of complexity in the design of experiments and require careful monitoring of nutrients and environment as the solution is exchanged for applying a different chemoelectrical gradient. Besides microfluidics, contemporary laboratory tools and protocols available to control the electrical state of a cell in these studies have been borrowed from electrophysiology and have limited capabilities for real-time control of chemoelectrical gradients. For example, a silver-silver chloride electrode (or) platinum electrode can impose an electrical gradient via the formation of electrical double layer but affect electrical state only in a limited manner. With a detailed numerical analysis lacking, the magnitude of charges that can affect the cell's electrical state from simple estimates is anticipated to be marginal. Hence, it is clearly established that contemporary approaches cannot change the concentration of species in real-time to affect the chemoelectrical potential and has an upper limit to regulate the electrical state.

Figure 3:
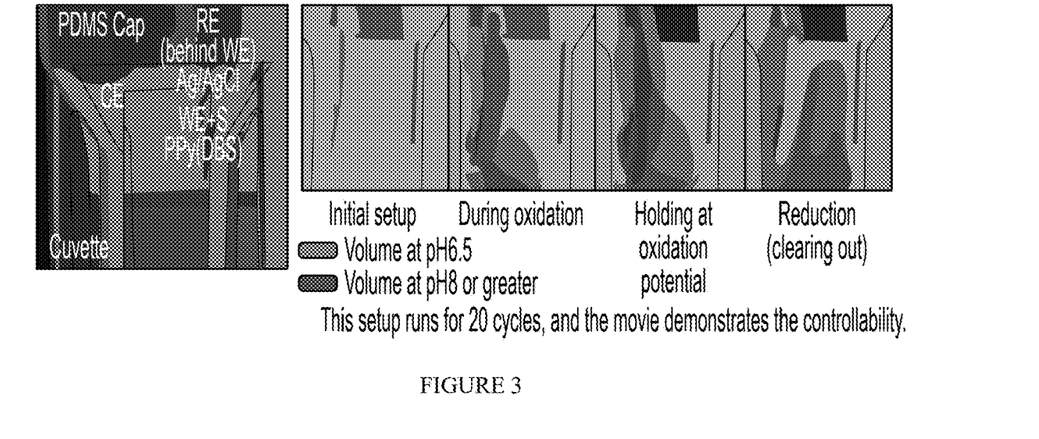
Figure 5:
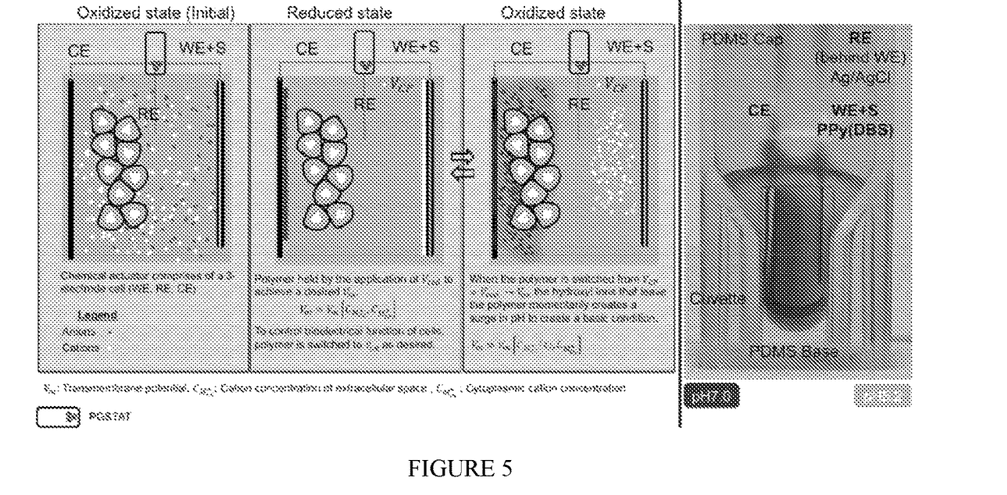
FIG. 5: Example of a device design that can leverage controlled regulation of pH for manipulation of cell bioelectricity.
Figure 6:
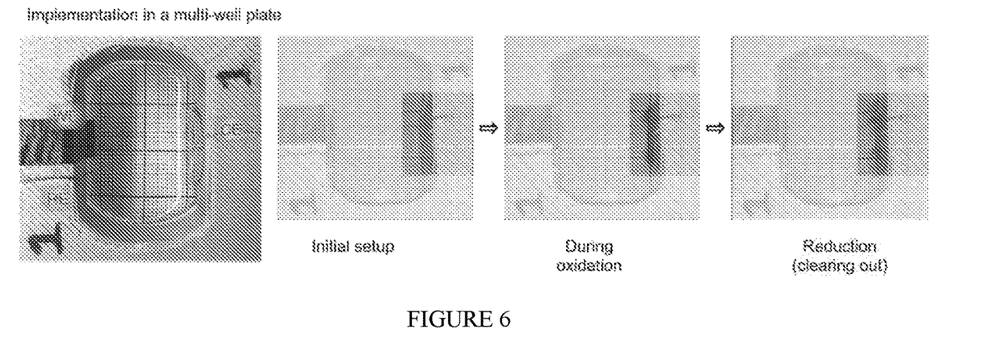
FIG. 6: Regulation of pH from 7 to 8 using bromothymol blue as indicator.
Figure 7:
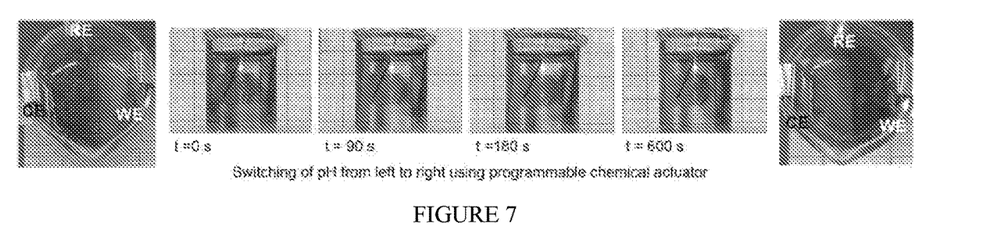
FIG. 7: Demonstration of switching the pH from one side of the electrochemical cell to the other with the RE defining the boundary between the different pH zones.

Using the demonstration in FIG. 3, if cultured cells are present in the electrochemical cell of the PCA shown in FIG. 5, pH can be used as a trigger for understanding biophysical processes that are relevant for understanding disease models and use it for therapeutics. reversible reduction and oxidation of polymer will remove and add ions from and to the solution as directed by the software in the electronic hardware. Thus, the cations and anions in the environment around the cell is scrubbed and stored in the conducting polymer and the counter electrode respectively. Besides the demonstration described in cuvette, the inventors have also demonstrated the feasibility to implement pH regulation in multiwell plates and 10 ml beaker.

In addition to studying biological processes, the chemical actuators disclosed herein can be used in various chemical transformations and purification processes. For instance, the membrane can be made selective for a specific ionic anchor such as cationic group, for instance an ammonium group (including primary, secondary, tertiary, and quaternary ammonium groups). In some embodiments, the compound can be derivatized with a choline group or similar moiety. The compound bearing the anchor can be temporarily immobilized on the conductive polymer by application of the appropriate electrical stimulus. The compound bearing the anchor can be reacted with various reagent, solvents and other compounds. After the reaction is complete, the anchor compound can be immobilized on the conductive polymer and the remaining reagents, solvents, and compound are removed. Desorbing the compound from the polymer yields the compound in purified form. If necessary, the anchor group can be removed from the compound. In other embodiments, the chemical actuators can be used for ion-exchange chromatography. Mixtures of compounds with ionizable groups can passed through a tube-shaped reaction chamber. The conductive polymer can be tuned to selectively absorb certain ionic species more readily than others, thereby permitting purification of the mixture. In certain instances, the system can be used to desalinate ocean and brackish water.

In yet further embodiments, the chemical actuators disclosed herein may be used to treat patients with various diseases, including neurological diseases. One or more neurons may be disposed with the reaction chamber, and application of an ionic motive force will recalibrate ion flow across the membrane.

Example Computing Device

It should be appreciated that the logical operations described herein with respect to the various figures may be implemented (1) as a sequence of computer implemented acts or program modules (i.e., software) running on a computing device (e.g., the computing device described in FIG. 8), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 8:
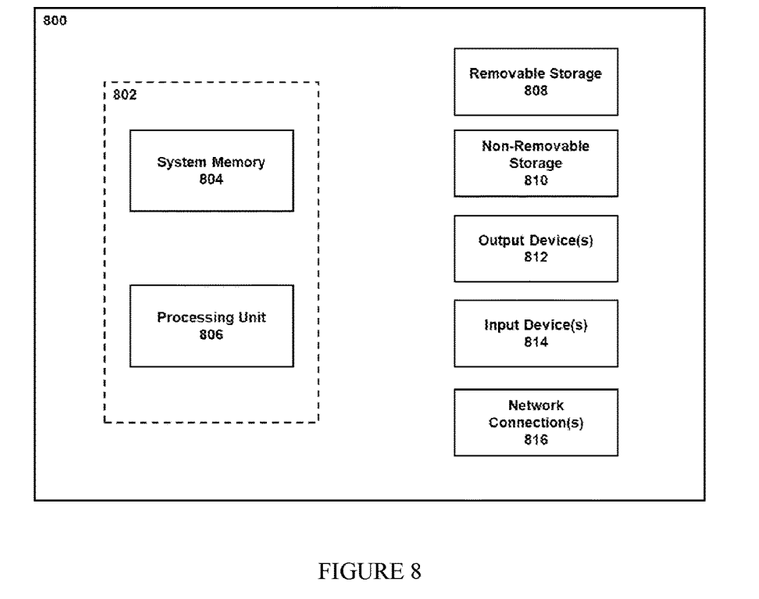
FIG. 8: Example computing device.

Referring to FIG. 8, an example computing device 800 upon which the methods described herein may be implemented is illustrated. It should be understood that the example computing device 800 is only one example of a suitable computing environment upon which the methods described herein may be implemented. Optionally, the computing device 800 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 800 typically includes at least one processing unit 806 and system memory 804. Depending on the exact configuration and type of computing device, system memory 804 may be volatile (such as random access memory (RAM)), non-volatile (such as read-only memory (ROM), flash memory, etc.), or some combination of the two. This most basic configuration is illustrated in FIG. 8 by dashed line 802. The processing unit 806 may be a standard programmable processor that performs arithmetic and logic operations necessary for operation of the computing device 800. The computing device 800 may also include a bus or other communication mechanism for communicating information among various components of the computing device 800.

Computing device 800 may have additional features/functionality. For example, computing device 800 may include additional storage such as removable storage 808 and non-removable storage 810 including, but not limited to, magnetic or optical disks or tapes. Computing device 800 may also contain network connection(s) 816 that allow the device to communicate with other devices. Computing device 800 may also have input device(s) 814 such as a keyboard, mouse, touch screen, etc. Output device(s) 812 such as a display, speakers, printer, etc. may also be included. The additional devices may be connected to the bus in order to facilitate communication of data among the components of the computing device 800. All these devices are well known in the art and need not be discussed at length here.

The processing unit 806 may be configured to execute program code encoded in tangible, computer-readable media. Tangible, computer-readable media refers to any media that is capable of providing data that causes the computing device 800 (i.e., a machine) to operate in a particular fashion. Various computer-readable media may be utilized to provide instructions to the processing unit 806 for execution. Example tangible, computer-readable media may include, but is not limited to, volatile media, non-volatile media, removable media and non-removable media implemented in any method or technology for storage of information such as computer readable instructions, data structures, program modules or other data. System memory 804, removable storage 808, and non-removable storage 810 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 806 may execute program code stored in the system memory 804. For example, the bus may carry data to the system memory 804, from which the processing unit 806 receives and executes instructions. The data received by the system memory 804 may optionally be stored on the removable storage 808 or the non-removable storage 810 before or after execution by the processing unit 806.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. An ionic motive force transducer, comprising:
    a chamber defining a volume;
    a working electrode disposed on one side of the chamber,
        a counter electrode disposed opposite the working electrode; and
    a reference electrode;
    wherein the working electrode comprises a conductive polymer optionally doped with a dopant in communication with a conductive substrate,
    wherein the conductive polymer is equilibrated by cyclic voltammetry between −600 mV and +600 mV with a scan rate of 10 mV/s for a predetermined time period until charge ingress/egress are equal such that the conductive polymer is selective to a predetermined ion and retains its selectivity in a complex electrolyte, wherein the conductive polymer undergoes reversible reduction and oxidation reaction such that proton and/or hydroxyls are removed and released from the working electrode and the counter electrode respectively into a medium.

2. The transducer according to claim 1, where in the working electrode and the counter electrode are in electrical communication with a processor.

3. The transducer according to claim 2, wherein the processor is configured to provide an electrical stimulus to the conductive substrate.

4. The transducer according to claim 2, wherein the processor is further configured to receive the pH of a solution within the chamber.

5. The transducer according to claim 4, further comprising an imaging device configured to capture one or more images of the solution, wherein the processor is further configured to: receive the one or more images of the solution; analyze the one or more images of the solution to determine a distribution of ions within the solution; and determine the pH of the solution based on the distribution of ions.

6. The transducer according to claim 5, wherein the processor is further configured to control the pH of the solution by applying an electrical signal to the working electrode.

7. The transducer according to claim 1, wherein the chamber defines a dish.

8. The transducer according to claim 7, wherein the dish comprises a base and at least one side wall.

9. The transducer according to claim 8, wherein the at least one side wall comprises a cylindrical side wall.

10. The transducer according to claim 1, wherein the chamber defines a channel.

11. The transducer according to claim 1, wherein the conductive polymer is selected from the group consisting of poly(pyrrole), poly(acetylene), poly(aniline), poly(p-phenylene vinylene), poly(fluorene), poly(phenylene), poly(pyrene), poly(azulene), poly(naphthalene), poly(carbazole), poly(indole), poly(azepine), poly(thiophene) poly(p-phenylene sulfide), poly(furan), and copolymer thereof.

12. The transducer according to claim 1, wherein the conductive polymer consists of poly(pyrrole).

13. The transducer according to claim 1, wherein the conductive polymer has a charge density from 0.01 to 1,000 $C/cm^2$.

14. The transducer according to claim 1, wherein the dopant is selected from the group consisting of dodecylbenzenesulfonate, polystyrene sulfonate, p-toluene sulfonate, 1,4-piperazinediethanesulfonic acid, and 4-(2-hydroxyethyl)piperazine-1-ethanesulfonic acid.

15. The transducer according to claim 1, wherein the conductive polymer selectively absorbs/desorbs one or more ions selected from $H^+$, $Li^+$, $Na^+$, $K^+$, $Be^{2+}$, $Mg^{2+}$, $Ca^{2+}$, or $Mn^{2+}$.

16. The transducer of claim 1, wherein the reference electrode defines a boundary between different pH zones.

17. The transducer of claim 1, wherein the working electrode has a thickness no greater than 50 microns.

* * * * *